Sept. 8, 1959　　　F. W. SCHWINN　　　2,902,882
MANUALLY OPERATED CONTROL DEVICE
Filed Dec. 12, 1957　　　　　　　　　　　　2 Sheets-Sheet 1

INVENTOR:
FRANK W. SCHWINN
BY
ATT'Y

Sept. 8, 1959 F. W. SCHWINN 2,902,882
MANUALLY OPERATED CONTROL DEVICE
Filed Dec. 12, 1957 2 Sheets-Sheet 2

INVENTOR:
FRANK W. SCHWINN
BY
Horton, Davis, Brewer & Bregman
ATT'Y

United States Patent Office 2,902,882
Patented Sept. 8, 1959

2,902,882

MANUALLY OPERATED CONTROL DEVICE

Frank W. Schwinn, Chicago, Ill.

Application December 12, 1957, Serial No. 702,287

2 Claims. (Cl. 74—533)

This invention relates to manually operated controls for shiftable devices and will be described with particular reference to its application as a control device for a three speed bicycle transmission.

Bicycles may presently be obtained equipped with a three speed transmission for changing the speed ratio between the pedal operated sprocket and the driving wheel of the bicycle. Such speed changers are controlled through a cable which is resiliently urged in one direction and manually adjusted to any one of three positions against the action of the resilient means. The manual adjustment is effected by a control device mounted within easy reach of the rider, the control device having a lever which may be manipulated across a ratchet to provide three definite stops for the lever.

It is among the principal objects of this invention to provide a control device for a multi-speed transmission for a bicycle or the like which device will be less expensive to build than those heretofore obtainable.

Another object of this invention is the provision of a control device for a multi-speed transmission the principal elements of which are readily made from stampings whereby to effect economies in the cost of manufacture of the device.

A more specific object of this invention has within its purview the provision of a control device for a multi-speed transmission which device may be readily assembled and held in assembled condition by a single screw.

Figure 1:
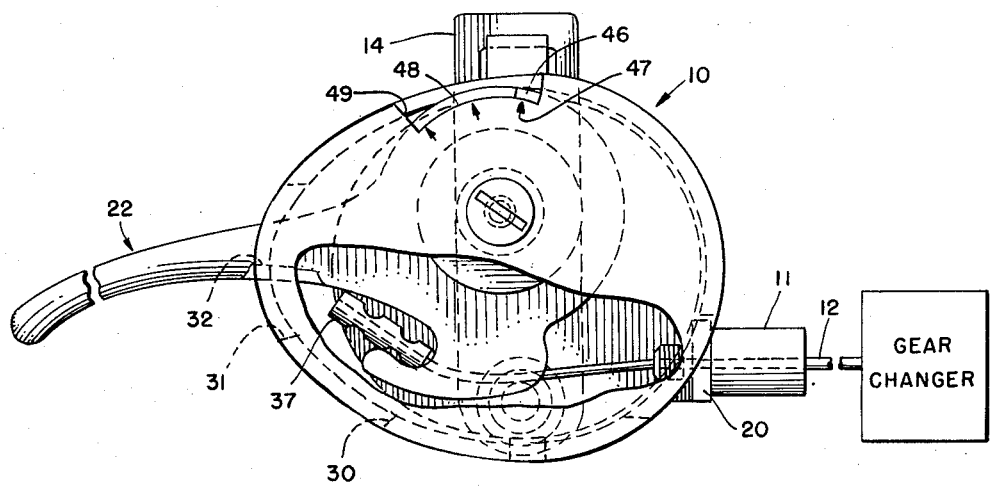
Figure 2:
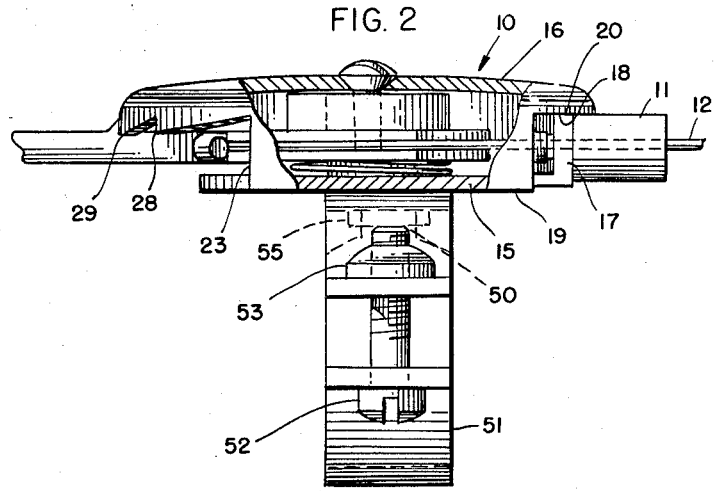
Figure 3:
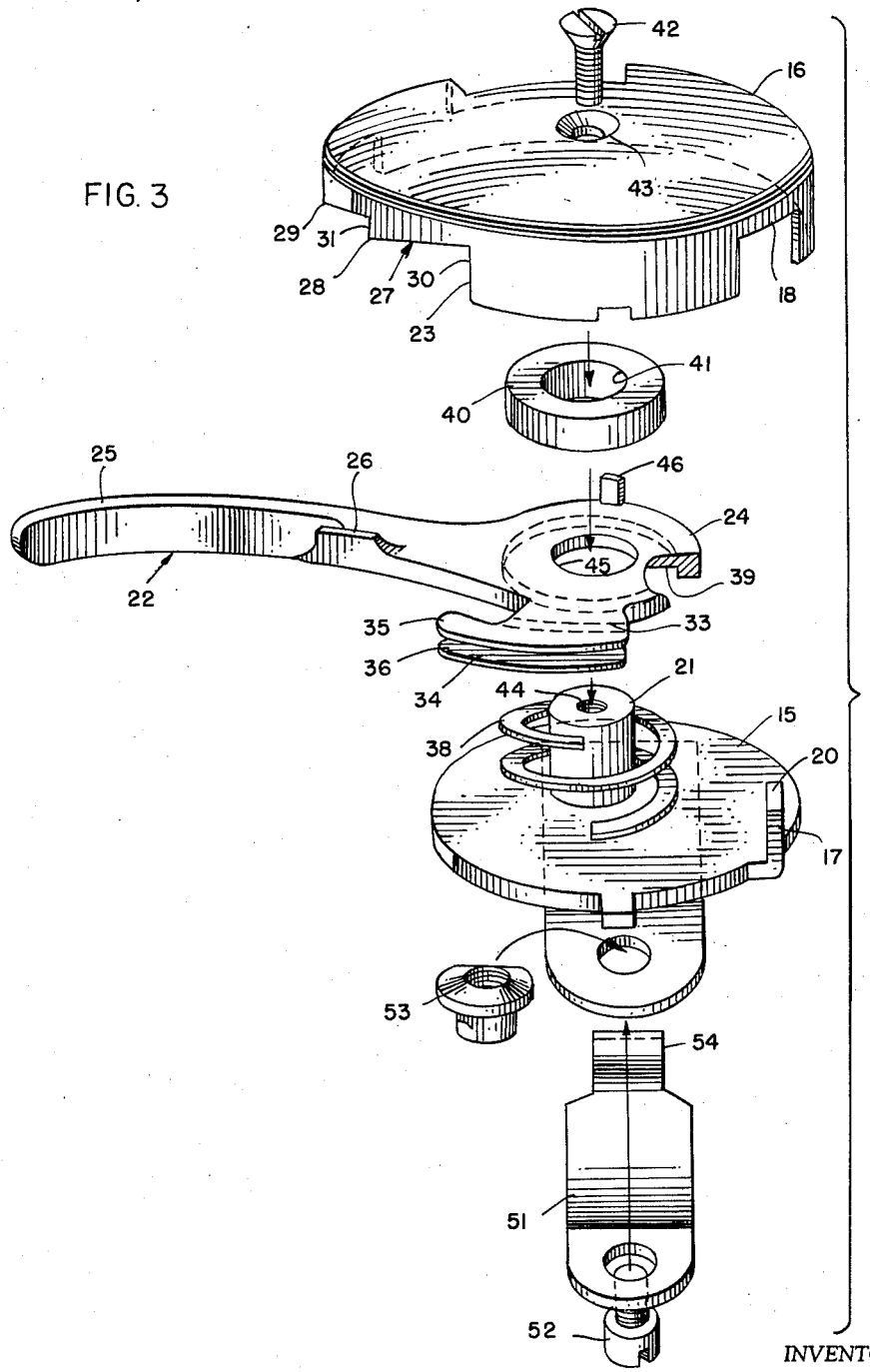

These and other objects of this invention will become apparent from the following detailed description when taken together with the accompanying drawings in which, Fig. 1 is a plan view, partly cut away, of a preferred embodiment of the control device of this invention, with the cable controlled thereby and the associated gear changer shown schematically;

Fig. 2 is a side elevational view of the control of Fig. 1, the view showing the housing for the control partly cut away; and Fig. 3 is an exploded view of the control device of Fig. 1, showing the configuration and relationship of the parts of which the device is comprised.

Referring now to the drawings for a detailed description of the preferred and illustrative embodiment therein depicted, the device is shown in its entirety at 10 as an ovoid container having a bushing 11 extending from the side thereof through which a cable 12 passes from the interior of the device 10 to a gear changer 13, shown herein only schematically, inasmuch as the construction of the changer may take any of the known forms. Normally, the gear changer is located in the hub of the rear wheel (not shown) of a bicycle and has its input sprocket driven through a chain from the pedal-operated sprocket (not shown) disposed forwardly of the rear wheel. The device 10 is provided with a clamp 14 by which the control device 10 may be secured to a forward frame member (not shown) of the bicycle within easy reach of the rider.

Said control device 10 is comprised of an ovoid housing having a base 15 and a cover 16 within which the base is received. Proper spacing between the cover and base is maintained in part by an up-standing lug 17 which is angularly disposed with respect to the general contour of the housing as viewed in Fig. 1, so that it extends partly into the housing under the cover and partly out of the housing. Cover 16 has a notch 18 formed in the lower edge 19 thereof to accommodate lug 18 and to provide a bearing surface for the upper edge 20 of the lug. Bushing 11 is secured directly to lug 17, either by welding, or by a threaded connection therewith. Lug 17 in the latter case is apertured and threaded to receive the bushing 11.

Disposed eccentrically of the general contour of the device 10 as viewed in Fig. 1 is a bushing 21 (Fig. 3) which may be welded or otherwise secured to the base 15. Rotatably mounted on bushing 21 is a control lever 22 which extends outwardly beyond the confines of the cover 16 through a notch 23 formed in the said lower edge 19 of the cover opposite notch 18.

Said lever 22 is made as a stamping from heavy gauge metal and consists of a hub portion 24 and a handle portion 25. Intermediate the hub and handle portions of lever 22 is transversely disposed pawl 26 which may be formed integrally with lever 22 by a suitable stamping or coining process. Said pawl 26 is designed to be received in notch 23 and to cooperate with the upper edge 27 of said notch. Said upper edge 27 is formed with two ratchet teeth 28, 29, thereby creating three vertical abutments 30, 31 and 32 (Fig. 1), the abutment 30 being one of the vertical edges of the notch 23.

Thus, lever 22, if urged upwardly against the ratchet teeth 28, 29 in notch 23 and in a counterclockwise direction about the bushing 21 as viewed in Fig. 1, may be made to assume three definite angular positions.

Cable 12 extends through bushing 11 and lug 17 into the cover 16. Lever 22 has formed thereon a radially outwardly extending sector 33 having a peripheral groove 34 on the exterior thereof, the groove portion terminating in spaced tangs 35, 36. As shown more clearly in Fig. 1, cable 12 has at its inner end an enlarged sleeve 37 which is clamped to cable 12 to prevent relative axial movement between the sleeve and cable. The diameter of sleeve 37 is greater than the width of groove 34 so that when the cable 12 is inserted in groove 34 with sleeve 37 disposed radially inwardly of the tangs 35, 36 and abutting on the adjacent side of sector 43, cable 12 becomes anchored to lever 22 insofar as counterclockwise movement (as viewed in Fig. 1) with respect to the lever is concerned. The gear changer is of the type that provides a continuous resilient pull on cable 12 to the right as viewed in Fig. 1, thereby exerting a constant force on the cable and lever 22 to turn the lever in such counterclockwise direction.

Lever 22 is held against the ratchet 27 by a helical spring 38 which may be conveniently placed around bushing 21 and centered by being received in a circular recess 39 in the underside of the hub 24. Upward movement of the hub of lever 22 is limited by a spacer washer 40 the central opening 41 of which is large enough to accommodate bushing 21 so that said bushing extends through spacer washer 40.

The entire assembly including the housing and the elements therein is held together by a machine screw 42 which is received in chamfered opening 43 in cover 16 and passes therethrough into a threaded opening 44 in the upper end of bushing 21. When completely assembled, spring 38 is compressed between base 15 and lever 22, and said lever is held against the spacer washer 40 which in turn abuts on the inner surface of cover 16. The opening 45 in lever 22 through which bushing 21 extends is slightly larger in diameter than the outside diameter of bushing 21 to permit a small amount of play between the lever and bushing, thereby enabling the lever to assume not only different angular positions with respect to the bushing, but also to assume positions out of a radial plane passing through the axis of bushing 21. Thus, lever 22 may be cocked with respect to the bushing to enable the pawl 26 to move over the teeth 28, 29 of the ratchet 27.

An indication of the setting of lever 22 with respect to the cover 16 may be had by observing the position of an axially extending lug 46 on hub 24 with relation to appropriate markings 47 stamped or otherwise etched into the outer surface of cover 16 adjacent to the curved edge 48 of a third notch 49 in cover 16 through which lug 46 extends.

As seen more clearly in Fig. 2, clamp 14 is comprised of a pair of straps 50 and 51, one of which 50 may be welded or otherwise permanently secured to base 15 and the other of which is adjustable relative to strap 50 by a clamping bolt 52 and cooperating nut 53. For convenience in assembly around the bicycle frame member (not shown), one end of the strap 51 may be formed as a bent tongue 54 which is received in a slot 55 in strap 50, thereby eliminating one of the clamping bolt-and-nut combinations while still providing a separable clamp for easy application to a round bar or the like.

It is understood that the foregoing description is merely illustrative of a preferred embodiment of this invention and that the scope of this invention is not to be limited thereto but is to be determined by the appended claims.

I claim:

1. A shiftable control for a cable or the like comprising a housing having a base and a flanged cover therefor defining a space therebetween, a toothed notch in the flange of the cover forming ratchet teeth, a lever extending from the interior of the housing through the toothed notch and cooperating therewith, pivot means in the housing for the lever, a second notch in the flange of the cover for the passage therethrough of the cable, said pivot means acting as a spacer between the cover and base, an abutment on the base extending into and contacting the second notch and constituting a second spacer between the cover and base, means for securing the flanged cover to the base, said abutment having an opening through which the cable passes and by which the cable is guided and means for anchoring the cable to the lever.

2. A shiftable control for a cable or the like as described in claim 1, said lever having a peripherally grooved sector thereon in proximity to the said abutment, said sector terminating in spaced tangs, and the means for anchoring the cable to the lever comprising a sleeve affixed to the cable and of a diameter greater than the width of said peripheral groove, said sleeve being disposed radially inwardly of said tangs and abutting on the sector when the cable is in the said peripheral groove.

References Cited in the file of this patent

UNITED STATES PATENTS

| | | |
|---|---|---|
| 654,422 | Stover | July 24, 1900 |
| 865,805 | Sangster | Sept. 10, 1907 |
| 927,984 | Larkin | July 13, 1909 |
| 1,647,896 | West | Nov. 1, 1927 |
| 2,560,154 | Brown | July 10, 1951 |
| 2,770,980 | Millward | Nov. 20, 1956 |
| 2,775,845 | Coates | Jan. 1, 1957 |